July 4, 1950 W. K. H. PANOFSKY 2,514,290
APERIODIC STABILIZER FOR INSTRUMENTS ON SHIPS
Filed April 20, 1944 3 Sheets-Sheet 3

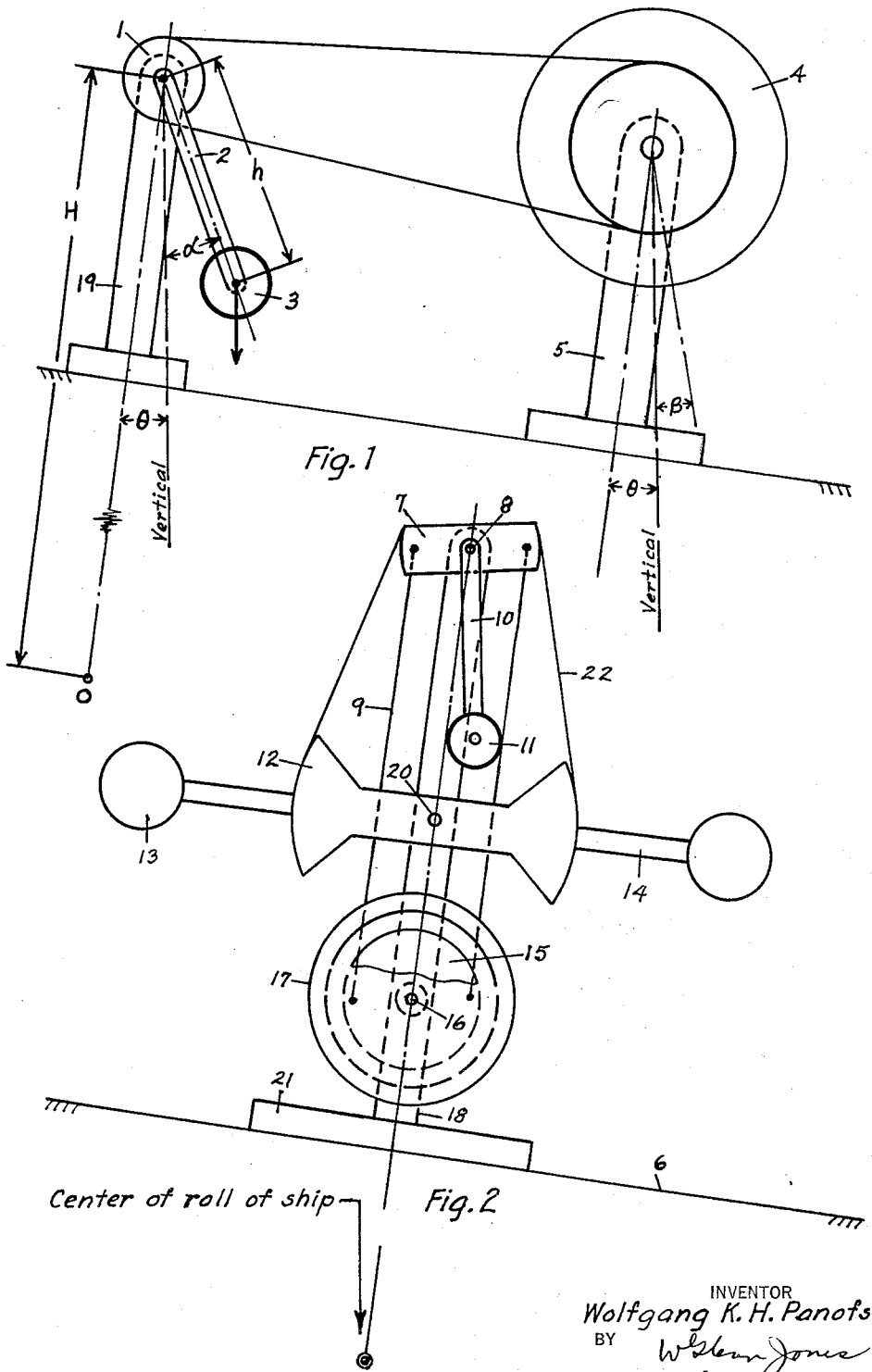

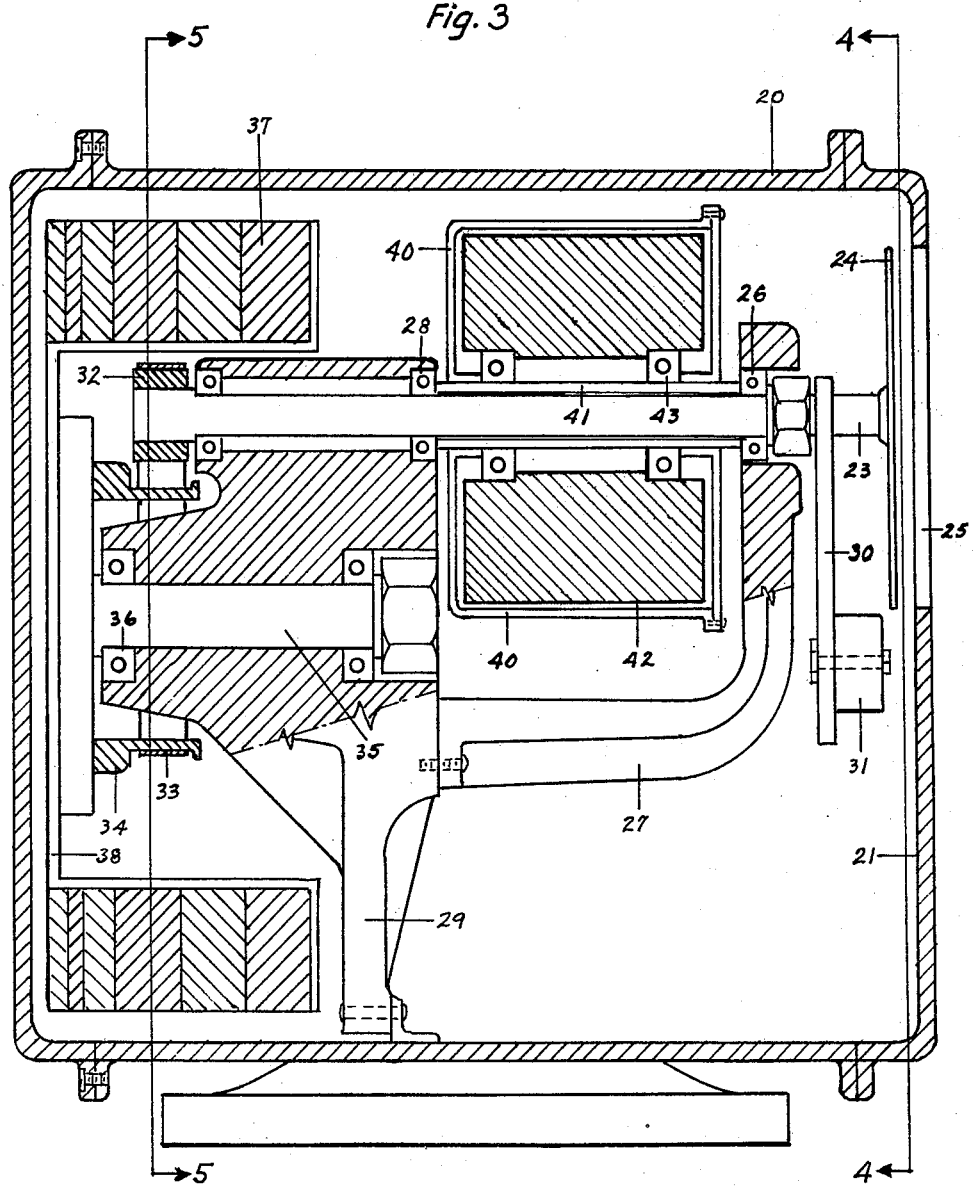

INVENTOR
Wolfgang K. H. Panofsky
BY
ATTORNEY

Patented July 4, 1950

2,514,290

UNITED STATES PATENT OFFICE 2,514,290

APERIODIC STABILIZER FOR INSTRUMENTS ON SHIPS

Wolfgang K. H. Panofsky, Pasadena, Calif., assignor to the United States of America as represented by the Secretary of the Navy Application April 20, 1944, Serial No. 531,974

11 Claims. (Cl. 114—191)

1

This invention relates in general to the problem of stabilizing instruments on an unstable base whose movement is in effect a rolling movement about a center substantially fixed with relation to the base. Although the invention may have various other useful applications, the one I have in mind at present, and used for purposes of explanation in this description, is the stabilization of optical instruments on board ship to compensate for roll and pitch. The device of the invention is intended to compensate for the translational acceleration which is present as a component of the motion of any part of ship's structure remote from its center of oscillation.

A. Assumptions of operation

The operation of the stabilizer about to be described depends upon the following simplifying assumptions regarding the motion of a ship. None of these assumptions are strictly fulfilled and to the extent that they are unfulfilled, the operation of the stabilizer will depart from perfection. (1) The center of oscillation of the ship is a fixed point in relation to the ship's structure. (2) The acceleration of the center of oscillation relative to the inertial frame of reference is negligible.

B. Objects of invention

It is an object of this invention to produce a device to compensate for the disturbing effect on a pendulum of the acceleration experienced by the pivot of the pendulum when that pivot is not situated at the center of oscillation of the ship, so that in spite of such acceleration of the pivot the pendulum may still hang truly vertical.

Another object of this invention is to permit a pendulum to be suspended anywhere on a ship at a point remote from the center of oscillation of the ship and insure that it will remain vertical to the same order of accuracy as it would if it were suspended at the main center of oscillation.

Another object of this invention is to provide a mechanical substitute for a servo-motor driven stabilizer controlled by a master pendulum situated at the center of oscillation of the ship.

Another object of this invention is the provision of a device which will be economical to manufacture, reliable in operation and which possesses all of the qualities of ruggedness and dependability in service.

Other objects and features will become apparent upon a careful consideration of the following detailed description when taken together with the accompanying drawings, the figures of which are

2 designed for the sole purpose of illustration and not as a definition of the limits of the invention, reference for the latter purpose being had to the appended claims.

In the drawings:

Figure 1 is a schematic view illustrating certain principles of this invention.

Figure 2 is a diagrammatic showing of a simple form of the apparatus of this invention.

Figure 3 is a longitudinal central section showing a typical developed form of my apparatus.

C. Mathematical analysis of operation

Figure 4:
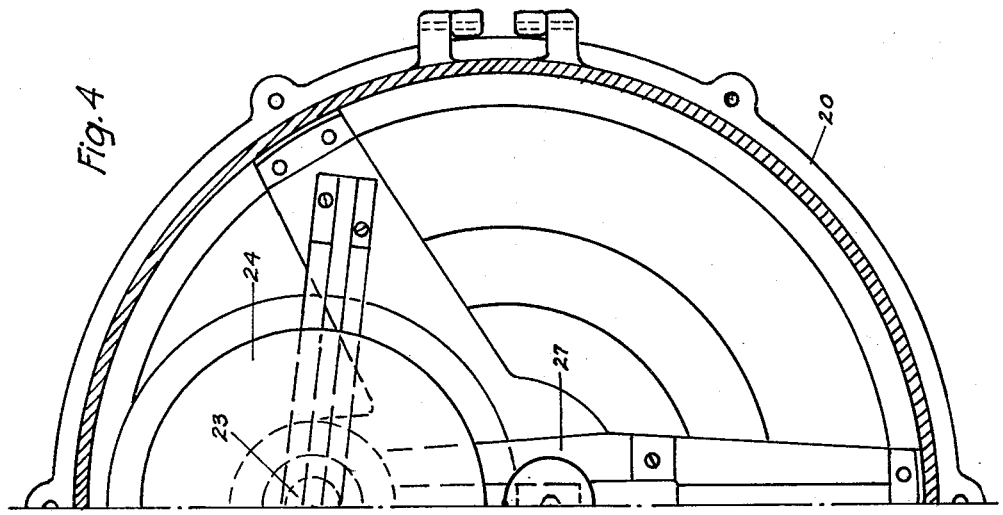
Figure 4 is a cross-section on line 4—4 of Figure 3.

The principle utilized in this device is the definite relationship between the angular acceleration of a ship and the resulting linear acceleration at a point remote from the center of oscillation. The method consists in coupling the pendulum mechanically to a flywheel or other body supported on the structure of the ship in neutral equilibrium in such a way that, relative to the ship when the pendulum oscillates through a specified angle $\varphi$, the flywheel rotates in the same sense also relative to the ship through an angle different in magnitude from but proportional to $\varphi$. It will be shown later that in order to minimize the moment of inertia required in the flywheel, the rotation of the flywheel relative to the ship should be one half the rotation of the pendulum relative to the ship.

Figure 1 is a schematic diagram of the device for compensating for roll around one axis only. It is not a practical embodiment, and it is drawn as shown simply to facilitate labelling the variables necessary to the mathematical analysis. The mechanical coupling connecting flywheel and pendulum, for example, need not in a practical embodiment be a belt transmission as shown. Referring to Figure 1, let $\theta$ be the angle between the true vertical and a plane through the keel of the ship normal to the deck; it is the instantaneous angle of roll. $\alpha$ is the angle between the pendulum and the vertical which it is our object to keep as nearly as possible equal to zero. $\beta$ is the angle of rotation of the flywheel relative to the true vertical. The mechanical coupling between the flywheel and pendulum imposes a constant ratio R between the rotations of these two bodies relative to the ship so that $$(\beta+\theta)=R(\alpha+\theta) \text{ or } \beta=R(\alpha+\theta)-\theta \quad (1)$$

Let the pendulum have a mass $m$, a radius of gyration $\kappa$, and let the distance from the center of gravity to the axis of rotation of the pendulum be $h$. Then $\lambda = \kappa^2/h$ is the equivalent length of a simple pendulum to the physical pendulum described.

By Newton's laws, applied to angular motion about the axis of rotation of the pendulum, we can equate the angular acceleration of the pendulum about its axis of rotation to the algebraic sum of the torques acting about that axis. There are three torques acting on the pendulum acting about the axis of rotation of the pendulum:

(1) The gravitational restoring torque: $-mgh\alpha$ (2) The torque due to the linear acceleration of the pendulum axis, caused by the ship's angular motion:

$$-hmH\frac{d^2\theta}{dt^2}$$

Here $H$ is the vertical component of the distance between the pendulum center and the center $O$ of the ship's oscillation.

(3) The torque $L$ transmitted through linkages to the pendulum from the flywheel.

Applying Newton's laws, we have:

$$m\kappa^2 \frac{d^2\alpha}{dt^2} = -mgh\alpha - hmH\frac{d^2\theta}{dt^2} - L \quad (2)$$

In the diagram, for simplicity, the pendulum center is shown directly above the ship center, but that need not be so. But for satisfactory operation of the device at large angles of compensation the pendulum center has to be nearly vertically above the ship's center of rotation. It will be understood of course that the plane of pendulum oscillation is parallel to the plane of the ship oscillation which is to be compensated.

The torque exerted by the flywheel on the pendulum results in a torque of reaction exerted by the pendulum on the flywheel equal to $L/R$, so that the equation of motion of the flywheel is $$\frac{L}{R} = I\frac{d^2\beta}{dt^2} \quad (3)$$

where $I$ is the moment of inertia of the flywheel. Differentiating (1) twice with respect to time and substituting it into (3) we obtain $$L = RI[R(\ddot{\alpha} + \ddot{\theta}) - \ddot{\theta}] \quad (4)$$

where the double dot (such as $\ddot{\alpha}$) indicates double differentiation with respect to the time. Substituting this value of $L$ into (2) and (3)

$$(m\kappa^2 + R^2I)\ddot{\alpha} + mgh\alpha = (-hmH - R^2I + RI)\ddot{\theta} \quad (5)$$

From an inspection of Equation 5 it is clear that if the coefficient of $\ddot{\theta}$ vanishes, our purpose will be accomplished. The equation of motion of the system will be $$(m\kappa^2 + R^2I)\ddot{\alpha} = -mgh\alpha \quad (6)$$

the ordinary equation of a physical pendulum with an unaccelerated pivot. It is to be noted, however, that this equation shows that the period will be $$T = 2\pi\sqrt{\frac{m\kappa^2 + R^2I}{mgh}} \quad (7)$$

The condition for compensation (vanishing of the coefficient of $\ddot{\theta}$) in Equation 5 is:

$$\frac{hmH}{I} = R(1-R) \quad (8)$$

It is to be noted that compensation cannot be obtained unless $R$ is less than unity.

The moment of the pendulum, $mh$, will be determined in magnitude by the stabilizing function to be performed. The height $H$ above the center of oscillation of the ship is fixed by the location where the stabilizer is required. Thus in order to minimize the requisite moment of inertia $I$, which the flywheel must have, the expression $R(1-R)$ must be a maximum. This is accomplished by making $R$ equal to $\frac{1}{2}$. Thus the condition for compensation with minimum moment of inertia in the flywheel is expressed by the two equations $$4hmH = I \quad (9)$$

$$R = \frac{1}{2} \quad (10)$$

If we insert these conditions into the equation (7) for the period of the compensated pendulum we obtain $$T = 2\pi\sqrt{\frac{\lambda + H}{g}} \quad (11)$$

showing that the compensated pendulum has the period of a simple pendulum of length $S = \lambda + H$ rather than its much shorter equivalent length $\lambda$.

In the ideal case in which Equations 9 and 10 are exactly satisfied this device will therefore perform two functions: (1) It eliminates any influence of purely rotary roll upon the action of the pendulum. (2) It changes the effective length of the pendulum from $\lambda$ to $\lambda + H$, where $H$ is the height of the pivot above the center of rotation of the boat.

D. *Analysis of operation in case of imperfect compensation*

In practice Equation 9 cannot be satisfied precisely, principally owing to the fact that the height $H$ of the pendulum pivot above the center of rotation will not remain invariant.

The equation of motion (5) of the system can be written as $$(m\kappa^2 + R^2I)\ddot{\alpha} + mgh\alpha = hmH\ddot{\theta}\delta \quad (12)$$

where $$\delta = \frac{IR(1-R) - hmH}{hmH} \quad (13)$$

represents the fractional deviation from the balance condition (8). By "fractional deviation from balance condition" we mean the difference of the quantity $hmH$ from the value $IR(1-R)$ required for ideal compensation, divided by the quantity $hmH$ itself. Consider the following example: let the quantity $H$ (representing the height of the point of suspension above the axis of rotation of the ship) deviate from the value $$H = \frac{IR(1-R)}{hm}$$

required by Equation 8 for perfect compensation. Let this deviation be designated by $\Delta H$. This means $$H = \frac{IR(1-R)}{hm} - \Delta H$$

Then by defiination $$\delta = \frac{IR(1-R) - hmH}{hmH} = +\frac{\Delta H}{H}$$

Hence in this case $\delta$ simply represents $\Delta H/H$.

If the optimum ratio $R = \frac{1}{2}$ is used, Equation 12 can be simplified to read $$S\ddot{\alpha} + g\alpha = \ddot{\theta}H\delta = \Delta H\ddot{\theta} \quad (14)$$

$$S = \kappa^2/h + H = \lambda + H \quad (15)$$

is the equivalent pendulum length of the compound system. Since in practice $\lambda \ll H$, Equation 14 can be reduced to $$\ddot{\alpha} + \omega_0^2 \alpha = \delta \ddot{\theta} \quad (16)$$

where $$\omega_0 = \sqrt{g/H}$$

is the natural angular frequency of the compound system. In that case $\theta = \theta_0 \cos \omega t$ and on differentiation $$\ddot{\theta} = -\omega^2 \theta$$

Hence the differential Equation 16 becomes:

$$\ddot{\alpha} + \omega_0^2 \alpha = -\delta \omega^2 \theta_0 \cos \omega t$$

Its solution is $$\alpha = \frac{\delta \omega^2}{\omega^2 - \omega_0^2} \times \theta_0 \cos \omega t$$

and hence we can obtain an expression for the ratio between $\alpha$ and $\theta$:

$$\frac{\alpha}{\theta} = \frac{\omega^2}{\omega^2 - \omega_0^2} \delta \quad (17)$$

We thus obtain a direct expression for the compensation ratio attainable with this device. Equation 17 assumes different forms in different frequency ranges:

$$\omega \gg \omega_0 \quad \alpha/\theta = \delta \quad (18)$$

$$\omega \ll \omega_0 \quad \alpha/\theta = \left[\frac{\omega}{\omega_0}\right]^2 \delta \quad (19)$$

$$\omega \approx \omega_0 \quad \alpha/\theta = \frac{\omega}{\omega - \omega_0} \times \frac{\delta}{2} \quad (20)$$

Hence if the period of the system exceeds the period of roll Equation 18, the compensation ratio simply approximates $\delta$; if the period of roll exceeds the period of the system, (Equation 19), the compensation ratio equals $\delta$ times the square of the ratio of the period of the system to the period of the roll. In the resonant case, Equation 20, the reduction ratio will materially depend on damping.

Let us consider a particular practical case: For a large ship the period is 10 seconds approximately. Consider the instrument to be placed at a point on the deck such that the height of the axis of the pendulum above the center of oscillation of the ship is 10 meters. Using Equation 17, we obtain $$\frac{\alpha}{\theta} = \frac{\delta}{1.52}$$

which is a satisfactory reduction ratio.

E. Theory of damper to be used with the aperiodic stabilizer

The theory outlined in Section D of these specifications treats the motion of the stabilizer in its steady state; however, it does not attempt to discuss the time required to reach that steady state. This time is essentially determined by the damping of the instrument.

Any damping force present between the members of the stabilizer described above will interfere with the balance Equation 8 which is essential to the operation of the instrument. On the other hand, a certain amount of damping is necessary in order to cause a sufficiently rapid decay of the transient solution of the differential Equation 5; thus transient solution represents the free oscillation of a pendulum of length $S = \lambda + H$ (see Equation 11).

A damping device in conjunction with the stabilizer must therefore fulfill the requirement that it does not give a rise to a damping force if the transient solution of Equation 5 is zero, but that it will contribute a damping term to the free oscillation of the system. This requirement can be fulfilled if damping of the pendulum is provided with respect to a neutral mass. Such a device could be constructed of two co-axial cylinders of radii $r_1$ and $r_2$; the outer one is linked to the pendulum, the inner one is freely rotating. Let the space between the cylinders be filled with liquid of coefficient of viscosity $\eta$. Let $I'$ be the moment of inertia of the inner cylinder and let $A'$ be the area of the cylinders. The operation of the device could be analyzed by setting up the differential equation of motion of the composite system and discussing its solution. Such a procedure turns out to be excessively complex and hence a simpler method of analysis is offered as follows: Take the optimum design condition for the damper to be the condition that the power delivered to the damper by the stabilizer shall be a maximum. Let the angular velocity of the outer cylinder be $\omega_1$ and the angular velocity of the inner cylinder be $\omega_2$. Let the outer cylinder be driven such that $$\omega_1 = A \cos at = R[Ae^{jat}] \quad (21)$$

where $a$ is the angular frequency of the transient motion of the stabilizer.

The notation R (complex quantity) here denotes the real part of the complex quantity. In the following Equations 22 to 26 we shall use the complex exponentials in place of sinusoidal terms, it being implied that the real part only is meant to have physical reality. In Equation 27 and the following equations, the real part is then taken. This procedure is just a mathematical expedient and can be shown to be fully justifiable.

The equation of the motion of the inner wheel becomes:

$$I'\dot{\omega}_2 = -\frac{r_1^2 \eta A'}{r_2 - r_1}(\omega_2 - \omega_1) = -k(\omega_2 - \omega_1) \quad (22)$$

where we have assumed that:

$$(r_2 - r_1)/r_1 \ll 1$$

Here:

$$k = \frac{\eta A' r_1^2}{r_2 - r_1} \quad (23)$$

From Equation 21 we obtain:

$$I'\dot{\omega}_2 + k\omega_2 = kAe^{jat} \quad (24)$$

and hence $$\omega_2 = \frac{k\omega_1}{jaI' + k} \quad (25)$$

Therefore the expression for the relative angular velocity between the members of the damper becomes:

$$\omega_2 - \omega_1 = \frac{jaI'}{jaI' + k}\omega_1 \quad (26)$$

Taking the real part, as outlined above:

$$\omega_2 - \omega_1 = R\left[\frac{jaI'Ae^{jat}}{jaI' + k}\right] = \frac{aI'A}{[k^2 + I'^2 a^2]^{1/2}}\left\{\sin\left[at - \tan^{-1}\left(\frac{aI'}{k}\right)\right]\right\} \quad (27)$$

The power absorbed by the damper is the product of the angular velocity of the outer (driven) member of the damper and the torque acting on the outer member due to frictional drag of the inner member. The instantaneous power is therefore given by:

$$P = \omega_1[k(\omega_2 - \omega_1)]$$

$$= \frac{aI'A^2k}{[k^2+I'^2a^2]^{1/2}}\left\{\sin\left[at - \tan^{-1}\left(\frac{aI'}{k}\right)\right]\right\}\{\cos(at)\} \quad (28)$$

We are not interested in the instantaneous value of this power, but in the mean power loss due to the damper, as averaged over a full cycle of oscillation of the system. Let us denote by a bar over a function the mean value of that function, averaged over a cycle. The expression for the mean power then becomes:

$$= \frac{kaI'A^2}{(k^2+a^2I'^2)^{1/2}}\left\{\left[\sin\left(\tan^{-1}\frac{aI'}{k}\right)\right]\overline{\cos^2 at} - \cos\left[\tan^{-1}\frac{aI'}{k}\right]\overline{\sin at \cos at}\right\}$$

$$= \frac{kaI'A^2}{(k^2+a^2I'^2)^{1/2}} \times \frac{I'}{(k^2+a^2I'^2)^{1/2}} \times \frac{1}{2}$$

$$= \frac{1}{2}kA^2\frac{aI'}{k^2+a^2I'^2} \quad (29)$$

If we put:

$$\rho = \frac{k}{aI'} \quad (30)$$

This reduces to:

$$\overline{P} = \frac{aI'A^2}{2}\frac{\rho}{\rho^2+1} \quad (31)$$

This expression for the power loss in the damper assumes a maximum value for $\rho = 1$ and the value of this maximum power is:

$$\overline{P} = \frac{aI'A^2}{4} \quad (32)$$

The condition $\rho = 1$ is equivalent to:

$$\eta = \frac{aI'(r_2 - r_1)}{A'r_1^2} \quad (33)$$

which is the design formula determining the viscosity of the medium in terms of the geometrical design parameters of the damper.

It is of interest to note that for optimum adjustment the expression $$|(\omega_2 - \omega_1)| = \frac{|\omega_1|}{\sqrt{2}} \quad (34)$$

gives the relation between the amplitude of the relative angular velocity and of the driving angular velocity.

F. *Theory of stabilizing torque produced by the stabilizing device*

In discussing the usefulness of the device described below, it is essential to have an expression for the stabilizing torque which the stabilizer provides toward the instrument to be stabilized.

The instrument to be stabilized can be characterized by its effective moment of inertia, elastic or gravitational restoring torque, and frictional torque. If the stabilizer is to be used with a given instrument, the effective moment of inertia and the restoring torque of the instrument can be included in the corresponding design parameters of the stabilizer. We are therefore concerned only with the effect of an external frictional torque on the stabilizer. Let the frictional torque on the stabilizer be $$L_f = -K(\dot{\alpha} + \dot{\theta}) \quad (35)$$

Equation 6, the equation of motion of the compensating pendulum becomes $$(m\kappa^2 + R^2I)\ddot{\alpha} + K\dot{\alpha} + mgh\alpha = -K\dot{\theta} \quad (36)$$

The motion is thus that of a damped pendulum acted on by an external torque of magnitude $$-K\dot{\theta}$$

Let us again assume that the angular motion of the ship is sinusoidal, i. e. that $$\theta = \theta_0 R(e^{j\omega t}) \quad (37)$$

For solving the differential equation 36, we put:

$$\alpha = \alpha_0 e^{j\omega t} \quad (38)$$

This results in the solution:

$$\alpha_0 = \frac{-Kj\omega\theta_0}{-(m\kappa^2 + R^2I)\omega^2 + jK\omega + mgh} \quad (39)$$

If the damping term $jK\omega$ in the above expression can be considered small relative to the other terms, we can simplify this expression into:

$$|\alpha_0| = \frac{K\omega}{mgh}\frac{\theta_0}{\omega^2/\omega_0^2 - 1} \quad (40)$$

If the frequency of the ship is considerably higher than the natural frequency of the stabilizer, this expression can be further simplified to read:

$$\frac{|\alpha_0|}{|\theta_0|} = \frac{K\omega}{mgh} \quad (41)$$

This, by Equation 35, can be interpreted to mean:

$$|\alpha_0| = \frac{L_f \text{ maximum}}{mgh} \quad (42)$$

Hence the pendulum will swing through an angle whose crest value (expressed in radians) is the ratio of the maximum frictional torque (produced by the instrument to be stabilized) to the gravitational restoring torque of the pendulum.

It is to be noted that the approximations made in arriving at Equation 42 are not necessary for the proper functioning of the device; their only purpose is to lead to a simplified expression which is valid over the range of parameters where the approximations made are valid. If the approximations are not valid, then the accurate expression, Equation 39, must be used in computing the stabilization ratio attainable in the presence of a frictional torque.

G. *Physical summary of the system*

A brief physical summary of the preceding analyses may be helpful to a clear understanding of the physical requirements of the apparatus.

The restoring or stabilizing power of the system depends solely on the product of $h$ and $m$, the length and mass of the pendulum, which are chosen in view of the power desired. This power, given by $mg$, then measures the restoring torque in gravitational units per radian displacement of the system to be stabilized.

As has been stated, the coupling ratio between the pendulum and the compensating neutral mass must be less than unity and is optimum at one-half. At that ratio the required compensating inertia is least. The ratio is not critical; small variations from the optimum are not greatly objectionable, but if the ratio approaches either zero or unity the necessary value of the inertia becomes very large or approaches infinity.

With the pendulum length and mass chosen, and the coupling ratio adopted, the optimum compensating inertia then depends upon the height (H) of the pendulum center about the center of oscillation of the support —e. g. of the ship (see Equation 8). Or, putting the matter in another way, for any given location relative to the oscillation center of the support, and assuming a coupling ratio preferably one-half, and specifying the desired stabilizing power, the three quantities, pendulum length and mass, and compensating inertia, may then be muutually chosen to give maximum compensation. And if adjustment is needed in any given installation to reach maximum compensation, that adjustment may be of any, or all, the three quantities just named.

The natural period of the compensated system, as stated, is the period of a pendulum having an equivalent length equal to that of the actual pendulum plus the height (H) of its center above the center of oscillation of the ship.

In all cases, the damping action is most effective when it absorbs power at the maximum rate. The angular velocity of the driven member of the damper, with relation to the ship, must be equal to that of the pendulum. These facts, and the explained neutral quality, are the damper's only essentials.

H. Actual device

In the preceding discussion the theory of a stabilizing device was described which essentially transforms a location at an arbitrary point on the ship to a location at the ship's center of oscillation. The perfection with which stabilization can be realized is limited by (1) Linear accelerations of the center of oscillation of the boat. (2) Variations in the position of the center of oscillation. (3) Friction of the moving parts relative to the boat. It is believed that limitation (1) and (2) are not of a serious extent in the case of roll, but may seriously affect the satisfarctory operation of the device in the case of pitch. The use of the device may therefore be limited to compensation of roll only.

It is believed that the friction in the device and in the optical instruments to be stabilized can be reduced sufficiently such that the error given by Equation 42 may be considered negligible.

The device for one degree of freedom and with $H=5\lambda$, approximately, has been constructed, Figure 2, and found to function very satisfactorily. The stabilizer of Figure 2 consists of a vertical member 18 mounted upon a base 21 which ordinarily rests upon the deck 6. Approximately midway of vertical support member 18 horizontal arm 14 is pivoted at 20. Arm 14 carries at its extremities inertia balls 13 and in proximity to its pivot 20 the working segments 12. From working segments 12 linkages 22 extend to cross beam 7 for supplying motion thereto. Cross beam 7 contains compensated pivot 8, upon which is hung pendulum 11 by arm 10.

The damping means is composed of flywheel 15 free to turn upon ball bearings on pivot 16 inside a freely rotatable fluid filled case 17 which is connected to cross-beam 7 by linkages 9. The degree of the damping depends on the inertia of the flywheel and the fluid viscosity. The optimum damping is simply that which dissipated the maximum power in the fluid.

As a means of testing the stabilizer the motion of the ship was simulated by a motor driven pivoted beam supporting device. Stabilization was tested with an optical lever. The most severe test of the stabilizer occurs when the impressed frequency is close to the natural frequency of the system. In the test model the impressed period was about 1 second, while the natural period of the system was 2 seconds. Despite these conditions, more adverse than in practice, compensation to within $\frac{1}{5}°$ for a 60° swing of the support could easily be obtained. The condition for optimum compensation is completely independent of the period of the moving support. The balance condition (Equation 8) was found to be in agreement with theory.

The damper was adjusted for optimum operation; in this condition a 30° transient was reduced to less than $\frac{1}{5}°$ within three full swings, Equation 34 determining the relative velocity of the two elements of the damper in optimum condition was verified.

I. Description of developed form

Figure 5:
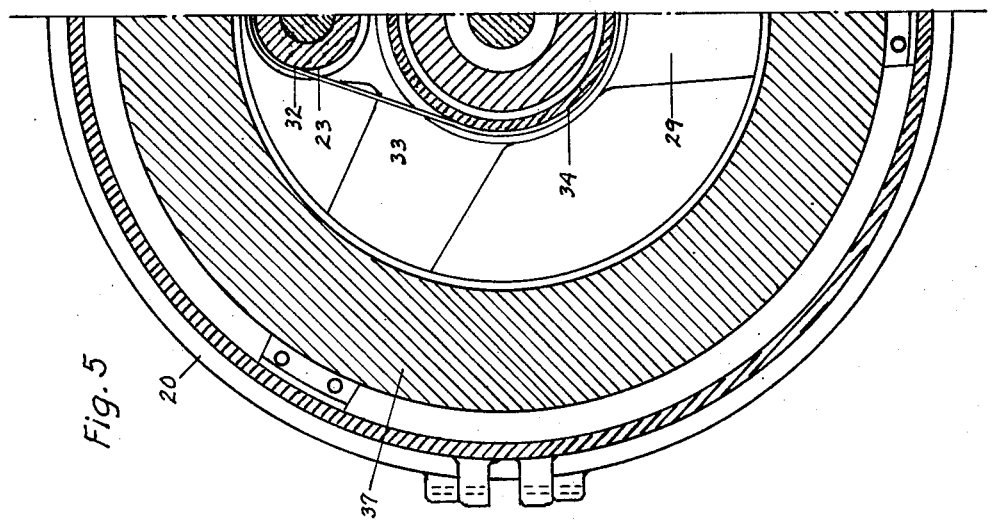
Figure 5 is a cross-section on line 5—5 of Figure 3.

Figures 3, 4, and 5 show a typical developed form of apparatus suitable for practical use. Here the entire apparatus is housed and supported in a casing 20, of which one end 21 is hinged at 22 for ready access to the interior mechanism. In the present design the pendulum shaft 23 is provided with a dial 24 which may be observed through window 25 as a stabilization indicator. An instrument to be stabilized may be connected to that shaft. Or the disk, or the pendulum itself may be thought of as the instrument being stabilized.

The pendulum shaft is mounted in bearing 26 in a supporting bracket 27 and in bearings 28 in a boss on the main supporting spider 29 which is mounted directly in case 20. The pendulum (arm 30 and adjustable mass 31) is mounted on shaft 23 directly behind case end 21 where it is accessible for length adjustment and/or change of mass. At the other end of shaft 23 a small sheave 32 takes a flexible metal belt 33 which runs over a larger sheave 34, the drive ratio being, preferably as stated, one-to-two. Sheave 34 is mounted on shaft 35 and overhangs the boss in which shaft bearings 36 are carried. The neutral compensating mass (I of the foregoing equations) is in the form of a metal annulus 37 mounted on shaft 35 via a supporting disk 38 and surrounding the bearing bosses.

The neutral damper mass is shown as preferably, although not necessarily, directly linked through viscous drag with the pendulum shaft 23. As shown here, it comprises fluid filled casing 40 rigidly mounted on a sleeve 41 which is rotatively locked to shaft 23. The neutral inertia mass of the damper is formed by a heavy annulus 42 mounted to rotate freely on bearings 43 on sleeve 41.

Adjustments for maximum compensation can be made by shifting the pendulum mass on its arm. Larger adjustments can be made by substituting different masses 31. And if it is desired to adjust the compensation without changing the restoring power of the pendulum, the inertia mass 37 may be adjusted. It may, for instance, be built up of a number of disks which may be placed and removed, so that its mass may be adjusted. In the test device of Figure 2 the inertia masses 13 on arm 14 are adjustable in radius along the arm, as well as changeable, to adjust the inertia, and the pendulum mass 11 is likewise adjustable on its arm 10.

To give some illustrative figures, I may state that the stabilizer of Figures 3, 4, and 5 has been designed with a view to installations in which H may range from zero up to about thirty feet. An idea of physical dimensions may be had from the fact that compensating mass 37 has mean diameter of 56 cm. (The figures are substantially to scale.) The pendulum mass and length, and the compensating mass, may be adjustably changed to give a wide variation in the restoring power and to adapt the instrument to variation of H. But, assuming H to be 30 feet, and assuming pendulum moment to be $5 \times 10^3$ gm.-cm., then the following figures result: (1) Restoring or stabilizing torque = $5 \times 10^3$ gm.-cm., (2) Moment of inertia of mass $37 = 2 \times 10^7$ gm.-cm.$^2$, (3) Weight of mass $37 = 25 \times 10^3$ g., (4) Mean diameter of mass $37 = 56$ cm.

J. List of symbols used in specifications $\varphi$ = angle of pendulum relative to ship.
$\theta$ = angle between vertical and line normal to deck of ship.
$\alpha$ = angle between pendulum and vertical.
$\beta$ = angle of rotation of compensating flywheel.
$\theta_0$ $\alpha_0$ = crest values relative to vertical of $\theta$ and $\alpha$.
R = transmission ratio.
$m$ = mass of pendulum.
$\kappa$ = radius of gyration of pendulum.
$h$ = distance from c. o. g. to point of suspension of pendulum.
$\lambda$ = equivalent length of simple pendulum to physical pendulum.
H = distance from point of suspension of pendulum to center of rotation of ship.
L = torque produced by flywheel on pendulum.
$g$ = acceleration of gravity.
I = moment of inertia of flywheel.
S = length of simple pendulum equivalent to composite system.
$\delta$ = fractional deviation from ideal compensation.
$\omega_0$ = natural angular frequency of compound system.
$\omega$ = angular frequency of ship.
$r_1$ = radius of outer member of damper.
$r_2$ = radius of inner member of damper.
$\eta$ = coefficient of viscosity of damping fluid.
$k = \eta A' r_1^2 / (r_2 - r_1)$
$\omega_1$ = angular velocity of outer member of damper.
$\omega_2$ = angular velocity of inner member of damper.
$I'$ = moment of inertia of inner member of damper.
$a$ = angular frequency of transient.
$\rho = k / a I'$
P = power loss in fluid.
$L_f$ = external frictional torque on compensator.
K = frictional torque per unit relative angular velocity.
$A'$ = contact area of damper.
A = amplitude of angular velocity of outer member of damper.
$|\ |$ = absolute value of
$R[\ ]$ = real part of
$j = \sqrt{-1}$

I claim:

1. In a stabilizer for compensating for oscillations of a support about an effective center, a compensated pendulum system, comprising a pendulum pivoted for gravitational oscillation at a pivot point removed from the effective center of support oscillation by a distance having a predetermined normally vertical component (H), a freely rotatable compensating mass of predetermined moment of inertia (I), about its rotational axis mounted in neutral equilibrium about that axis on the oscillating support, and movement transmitting connection between the pendulum and inertia mass such that the ratio (R) of angular velocity of the latter to that of the former is less than unity.

2. A stabilizer as specified in claim 1, and in which the stated angular velocity ratio is approximately one-half.

3. A stabilizer as specified in claim 1, and in which the moment of inertia (I) of the compensating mass is substantially defined by the formular, $R(1-R)(I) = hmH$, where $h$ and $m$ are, respectively, the length and mass of the pendulum.

4. A stabilizer as specified in claim 1, and in which the moment of inertia (I) of the compensating mass is substantially defined by the formula, $R(1-R)(I) = hmH$, where $h$ and $m$ are, respectively, the length and mass of the pendulum, and where the ratio R is approximately one-half.

5. A stabilizer as specified in claim 1, and which also includes a neutral power dissipative damping means having one member connected to oscillate with the compensated pendulum system.

6. A stabilizer as specified in claim 1, and in which the inertia (I) of the compensating mass is substantially defined by the formula, $$R(1-R)(I) = hmH$$

where $h$ and $m$ are, respectively, the length and mass of the pendulum, and where the ratio R is approximately one-half, and the stabilizer also including a neutral power dissipative damping means having one member connected to oscillate with the compensated pendulum system.

7. A stabilizer of the type herein described, comprising a frame, a pendulum shaft and an inertia mass shaft journalled in the frame, rotation transmitting connection between the two shafts such that the ratio of angular velocity of the latter to that of the former is less than unity, a pendulum suspended from the pendulum shaft, an inertia mass mounted in neutral equilibrium on the inertia mass shaft, and a neutral damping means mounted in neutral equilibrium on one of the shafts.

8. A stabilizer as specified in claim 7, and in which the length and mass of the pendulum and the moment of inertia of the inertia mass are adjustable.

9. A stabilizer as specified in claim 7, and in which the neutral damping means is mounted directly on the pendulum shaft.

10. A stabilizer of the type herein described, comprising a frame, a pendulum shaft and an inertia mass shaft journalled in the frame parallel to each other, rotation transmitting connection between the two shafts such that the ratio of angular velocity of the latter to that of the former is approximately one-half, a pendulum suspended from the pendulum shaft, an inertia mass mounted in neutral equilibrium on the inertia mass shaft, a neutral damping means comprising two concentrically rotatable members with a damping fluid between them, one of said members being directly mounted on and rotating with the pendulum shaft, the relations of the several parts being determined approximately by the formula, $R(1-R)(I) = hmH$, where R is the ratio stated above, I is the inertia moment of the inertia mass, $h$ and $m$ are, respectively, the length and mass of the pendulum, and H is the vertical component of the radius of the oscillation to which the stabilizer is applied.

11. Method of compensating for rolling motion of a support about an effective center, comprising the steps of, establishing a pendulum on an oscillating center at height H above the rolling center, applying a neutrally supported rotatable inertia mass to the pendulum in such manner that the ratio (R) of angular velocity of the former to that of the latter is approximately one-half, and adjusting the moment of inertia (I) of the inertia mass to substantially the value expressed by, $R(1-R)(I)=hmH$, where $h$ and $m$ are, respectively, the length and mass of the pendulum.

WOLFGANG K. H. PANOFSKY.

No references cited.